E. GROOM.
KITCHEN SINK PLUG.
APPLICATION FILED NOV. 12, 1915.
1,173,798.
Patented Feb. 29, 1916.
FIG. 1.
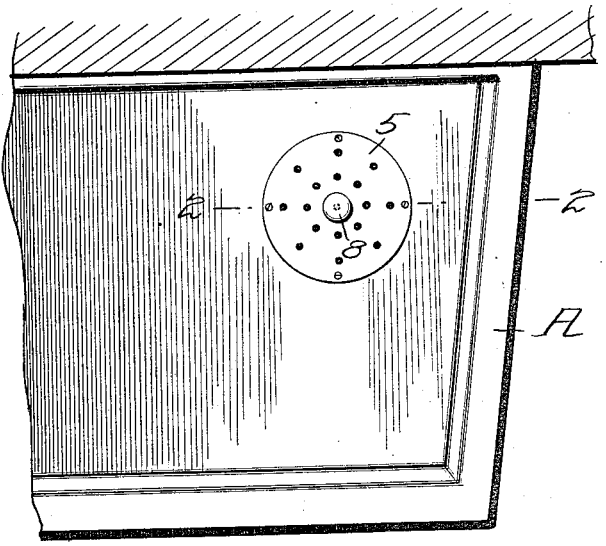
FIG. 2.
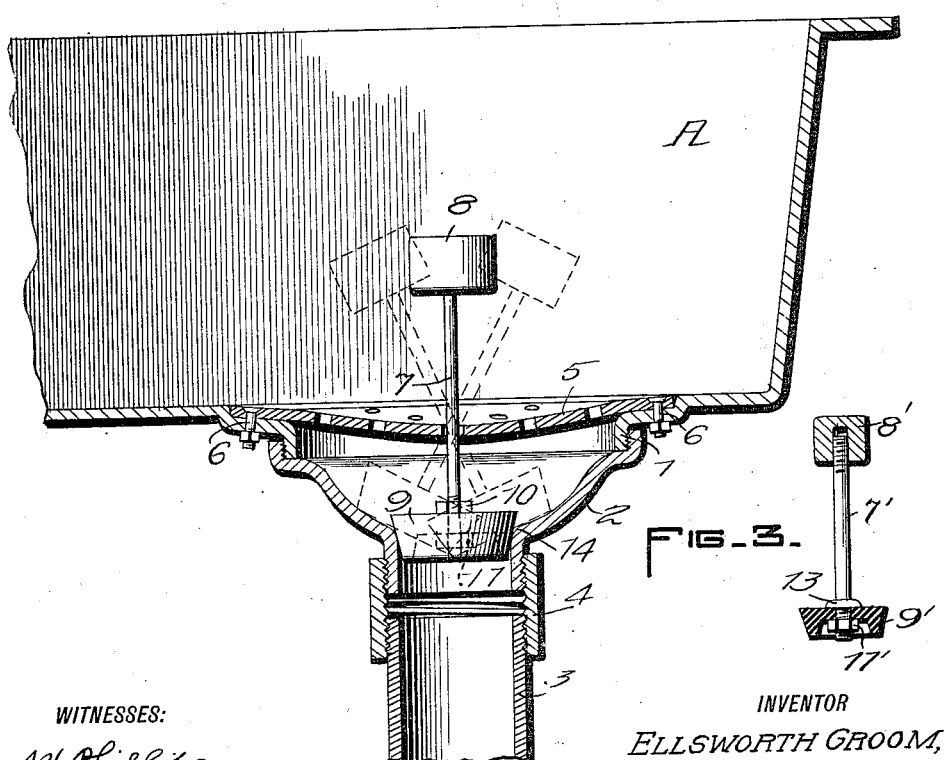
FIG. 3.
WITNESSES:
J. H. Phillips
R. W. Smith
INVENTOR
ELLSWORTH GROOM,
BY Munn & Co.
ATTORNEYS

UNITED STATES PATENT OFFICE.

ELLSWORTH GROOM, OF PORTLAND, OREGON, ASSIGNOR OF ONE-HALF TO WILBURN FAIRCHILD, OF TACOMA, WASHINGTON.

KITCHEN-SINK PLUG.

1,173,798.  Specification of Letters Patent.  Patented Feb. 29, 1916.

Application filed November 12, 1915. Serial No. 61,107.

*To all whom it may concern:*

Be it known that I, ELLSWORTH GROOM, a citizen of the United States, and a resident of Portland, in the county of Multnomah and State of Oregon, have invented a certain new and useful Improvement in Kitchen-Sink Plugs, of which the following is a specification.

The main object of my invention is to provide a plug to stop the outlet in a kitchen sink, which may be readily applied to the ordinary drain pipe having a strainer plate in the base of the sink over its inlet, and having its end outwardly flared and screwed into the base of the sink.

A further object of my invention is to provide a device which shall be securely attached to the strainer plate, so as to prevent accidental displacement or loss of the plug.

A still further object is to provide a simple and inexpensive construction which may be readily operated to open or close the drain outlet.

My invention is illustrated in the accompanying drawing forming a part of this specification, in which like reference characters indicate like parts throughout the several views.

Figure 1 is a plan view of a kitchen sink showing the drain outlet with my plug in position. Fig. 2 is an enlarged side elevation on the line 2—2 of Fig. 1. Fig. 3 is a view of a modified form of plug upon a reduced scale.

In the drawings, A is a standard kitchen sink having a downwardly flared annular lip 1 surrounding the drain outlet in its bottom. To this lip is threaded the usual bowl 2, which is connected with the drain pipe 3 by a standard coupling 4. The bowl 2 is made with an annular shoulder 14 forming a valve seat upon which the plug to be hereinafter described seats to close the drain pipe. The opening in the sink bottom is covered by the usual strainer plate 5 secured to the bottom of the sink by bolts 6.

My improved plug comprises a shank 7 of a size capable of freely moving through one of the openings in the strainer plate. Upon the upper end of this shank is formed a weighted knob or handle 8 by which the plug may be raised. The lower end of the shank is screw threaded for an appreciable distance and is adapted to receive a tapering valve 9 preferably made of rubber. Nuts 10 and 11 are screwed on to the shank 7 above and below the valve respectively to hold the same securely at any desired position upon the shank.

A modified form of plug is shown in Fig. 3, in which the upper end of the shank 7' is threaded to receive a knob 8'. The shank near its lower end is formed with a shoulder 13 against which a tapering valve 9' bears. A nut 11' is screwed onto the lower end of the shank to hold the valve in position.

In placing my improved plug in position, the tapering valve 9 or the knob 8' is removed from the shank, depending upon whether the form shown in Figs. 2 or 3 is used. The strainer plate in the bottom of the sink is next removed and the shank of the plug is inserted through the central hole of the strainer. The valve or the knob is then screwed onto the shank, depending upon which one has been removed, and the strainer plate is bolted in position with the plug extending into the drain pipe.

When it is desired to stop the flow of liquid through the drain pipe, the plug is forced downward until the valve is seated against the annular shoulder 14 as shown in full lines in Fig. 2. When it is desired to open the drain, the plug is raised slightly and swung to one side with the valve resting upon the face of the bowl 2, and the shank of the plug binding in the opening in the strainer plate as shown in dotted lines in Fig. 2. The valve will be held in this position away from its seat by the weight of the knob 8. The length of the shank of the plug between the knob and the valve may be adjusted as desired by screwing the valve or knob, depending upon the form used, up or down.

It will be seen that I have provided a simple device of inexpensive construction which will always be accessible to quickly open or close the drain pipe of a sink.

I claim:—

1. The combination with a sink having a drain outlet, of a drain bowl beneath the same having an annular shoulder therein forming a valve seat, a strainer plate covering the drain outlet and a plug comprising a shank extending through one of the openings in the strainer plate and having a weighted knob upon its upper end and a valve adjustably secured upon its lower end and adapted to bear against the above mentioned valve seat in operative position, the said plug being adapted to be swung to one side and held by the weight of the said knob, so that the shank binds the openings in the strainer plate and the valve rests upon the face of the drain bowl to open the drain.

2. The combination with a sink having a drain outlet, of a drain bowl beneath the same having a valve seat formed therein, a strainer plate covering the drain outlet, a shank extending through an opening in the strainer plate, a valve on the lower end of the shank adapted to engage the above mentioned valve seat to close the drain, the said shank being adapted to be swung to one side so that the valve rests upon the face of the drain bowl to open the drain.

3. The combination with a sink having a drain outlet, of a drain bowl beneath the same having a valve seat formed therein, a strainer plate covering the drain outlet, a plug extending through the strainer plate and having a weighted knob on its upper end and a valve on its lower end adapted to close the drain bowl, the said plug being adapted to be swung to one side so that it binds in the opening in the strainer plate and is held in such position by the weight of the said knob to open the drain.

4. The combination with a sink having a drain outlet of a drain bowl beneath the same having a valve seat formed therein, an apertured plate covering the drain outlet, a plug extending through the said apertured plate comprising a shank having a weighted knob upon its upper end and screw threads upon its lower end, a tapering valve upon the lower end of the shank and a nut upon the same above and below the valve to hold it in adjustable position upon the shank, the said plug being adapted to be swung to one side and held by the weight of the said knob, so that the shank binds in the apertured plate and the valve rests upon the face of the drain bowl.

5. The combination with a drain pipe having a valve seat formed therein of an apertured plate covering the said drain pipe, a plug extending through the said apertured plate having a knob at its upper end and a valve at its lower end adapted to engage the above mentioned valve seat, the said plug being adapted to be swung to one side so that it binds in the said apertured plate and is held in such position by the weight of the said knob.

6. The combination with a drain pipe having an outwardly flared head forming a bowl, of an apertured plate covering the said drain pipe, a plug extending through the said plate and adapted to close the said drain pipe or to be swung to one side with its lower end resting upon the said bowl and bind in the said apertured plate to open the drain.

ELLSWORTH GROOM.

Copies of this patent may be obtained for five cents each, by addressing the "Commissioner of Patents, Washington, D. C."